(12) United States Patent
Mueck et al.

(10) Patent No.: US 8,780,745 B2
(45) Date of Patent: Jul. 15, 2014

(54) COMMUNICATION TERMINAL, COMMUNICATION DEVICE, METHOD FOR MEASURING A SIGNAL AND METHOD FOR REQUESTING A MEASUREMENT

(75) Inventors: Markus Dominik Mueck, Unterhaching (DE); Andreas Schmidt, Braunschweig (DE); Wen Xu, Neubiberg (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 354 days.

(21) Appl. No.: 13/017,075

(22) Filed: Jan. 31, 2011

(65) Prior Publication Data

US 2012/0195207 A1    Aug. 2, 2012

(51) Int. Cl.
    *G01R 31/08* (2006.01)
(52) U.S. Cl.
    USPC ........................................... 370/252
(58) Field of Classification Search
    USPC ......... 370/203, 204–215, 229–240, 310–337, 370/338–350, 351–394, 395.1, 395.3, 370/395.4, 395.41, 395.42, 395.5, 395.52, 370/431–357, 458–463, 464–497, 498–529
    See application file for complete search history.

(56) References Cited

U.S. PATENT DOCUMENTS

| | | | |
|---|---|---|---|
| 6,272,325 B1* | 8/2001 | Wiedeman et al. | 455/117 |
| 2002/0002052 A1* | 1/2002 | McHenry | 455/447 |
| 2002/0006174 A1* | 1/2002 | Nafie et al. | 375/346 |
| 2002/0193086 A1* | 12/2002 | Bauernschmitt et al. | 455/126 |
| 2004/0131011 A1* | 7/2004 | Sandell et al. | 370/210 |
| 2006/0287001 A1* | 12/2006 | Budampati et al. | 455/552.1 |
| 2007/0070691 A1* | 3/2007 | Walvis et al. | 365/185.03 |
| 2007/0078924 A1* | 4/2007 | Hassan et al. | 709/200 |
| 2007/0086349 A1* | 4/2007 | Liu | 370/241 |
| 2008/0311866 A1* | 12/2008 | Roux et al. | 455/127.1 |
| 2009/0175368 A1* | 7/2009 | Pugel | 375/260 |
| 2010/0087149 A1* | 4/2010 | Srinivasan et al. | 455/63.1 |
| 2011/0222493 A1* | 9/2011 | Mangold et al. | 370/329 |
| 2012/0281594 A1* | 11/2012 | Stewart et al. | 370/259 |

FOREIGN PATENT DOCUMENTS

| | | |
|---|---|---|
| CA | 2443871 A1 | 10/2003 |
| CN | 1953402 A | 4/2007 |
| JP | 9107321 A | 4/1997 |
| JP | 2004094687 A | 3/2004 |
| WO | 03003193 A1 | 1/2003 |
| WO | 2009018584 A1 | 2/2009 |
| WO | 2009109811 A1 | 9/2009 |
| WO | 2009136163 A2 | 11/2009 |

OTHER PUBLICATIONS

ETSI TR 102 680 V1.1.1 (Mar. 2009) Reconfigurable Radio Systems (RRS); SDR Reference Architecture for Mobile Device, Mar. 2009, pp. 1-23.

(Continued)

*Primary Examiner* — Jung-Jen Liu
(74) *Attorney, Agent, or Firm* — Schwabe, Williamson & Wyatt, P.C.

(57) ABSTRACT

A communication terminal is described comprising a transmitter configured to generate a transmit signal and a measurement circuit configured to receive the generated transmit signal and to measure the power of the received transmit signal in a predetermined frequency region.

22 Claims, 14 Drawing Sheets

(56) References Cited

OTHER PUBLICATIONS

ZXF103, Variable Q Filter, available at http://www.datasheetcatalog.org/datasheets1320/373508_DS.pdf, Apr. 2002, pp. 1-9.

Global Certification Forum Announcement: "Scheme to include around 360 test cases to give high levels of assurance of interoperability for the first LTE devices", http://www.globalcertificationforum.org/WebSite/Public/LTE_Certification.aspx, Jan. 8, 2010, p. 1.

Office action received for China Patent Application No. 201210021482.X, mailed on Dec. 9, 2013, 10 pages of Office action and 24 pages of English translation.

* cited by examiner

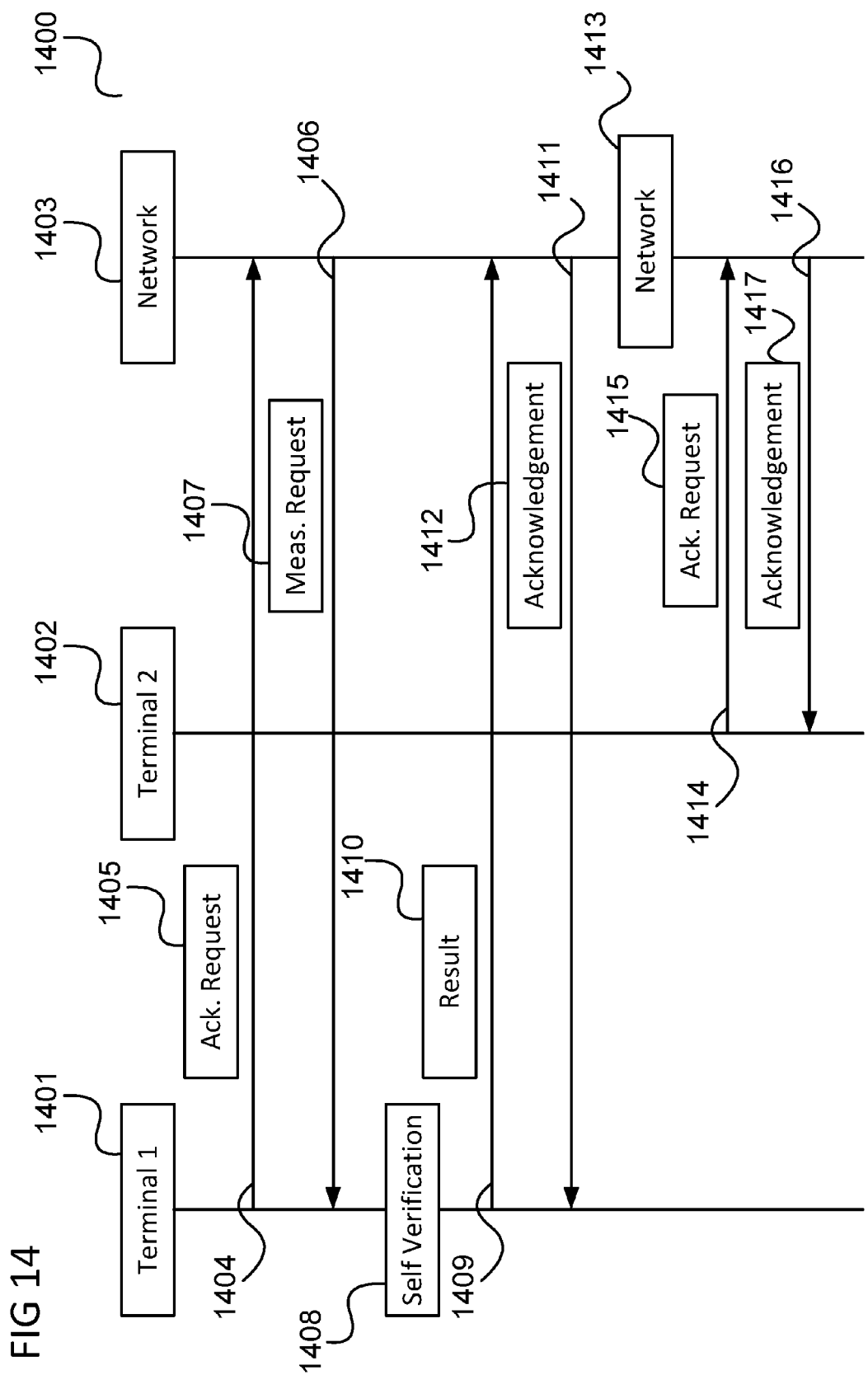

COMMUNICATION TERMINAL, COMMUNICATION DEVICE, METHOD FOR MEASURING A SIGNAL AND METHOD FOR REQUESTING A MEASUREMENT

TECHNICAL FIELD

Embodiments generally relate to a communication terminal, a communication device, a method for measuring a signal and a method for requesting a measurement.

BACKGROUND

Communication devices such as mobile terminal device support an increasing number of radio communication technologies. Since the number of possible configurations of such communication devices strongly increases accordingly (e.g. in accordance with the possible combinations of radio communication technologies that may be used on communication devices), efficient ways for verification of proper operation (e.g. with regard to operation in accordance with specified spectrum power masks) of such communication devices are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 14 shows a message flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Mobile communication devices, also referred to as mobile devices (MDs) in the following, for example including user equipments (UEs), typically need to undergo a validation/certification process prior to being put onto the market. For example, the USA require a type approval approach, while in Europe certification is typically addressed by a harmonized ETSI Standard.

The verification/certification process is typically a lengthy and expensive procedure. Further challenges arise with communication devices entering the market which are supporting an ever growing number of radio communication technologies, e.g. according to different radio communication standards.

For example, a communication device may support radio communication according to 3GPP, WiFi (IEEE 802.11a/b/g/n), Bluetooth, etc. communication standards and (eventually) 3GPP2, WiMAX (IEEE 802.16e based), etc. communication standards. In the framework of the future IMT-Advanced initiative, the existing heterogeneous environment may presumably be further enriched by a number of highly complex communication standards, including for example 1 Gbps WiFi Next generation based on IEEE 802.11 ac (below 6 GHz) and IEEE 802.11 ad (at 60 GHz), OFDM based 3GPP LTE-Advanced (in contrast to WCDMA based 3G), WiMAX evolution as defined in IEEE 802.16m, etc. It may be expected that future communication devices will support most or all of these communication standards and that the complexity for communication device verification/certification will rise correspondingly.

The transmitter of a communication device may for example be set to operate according to different radio communication technologies, e.g. radio communication according to different standards. According to current standardization activities, however, a communication device may also be able of to operate according to a multitude of radio standards simultaneously. This is illustrated in FIG. 1.

Figure 1:
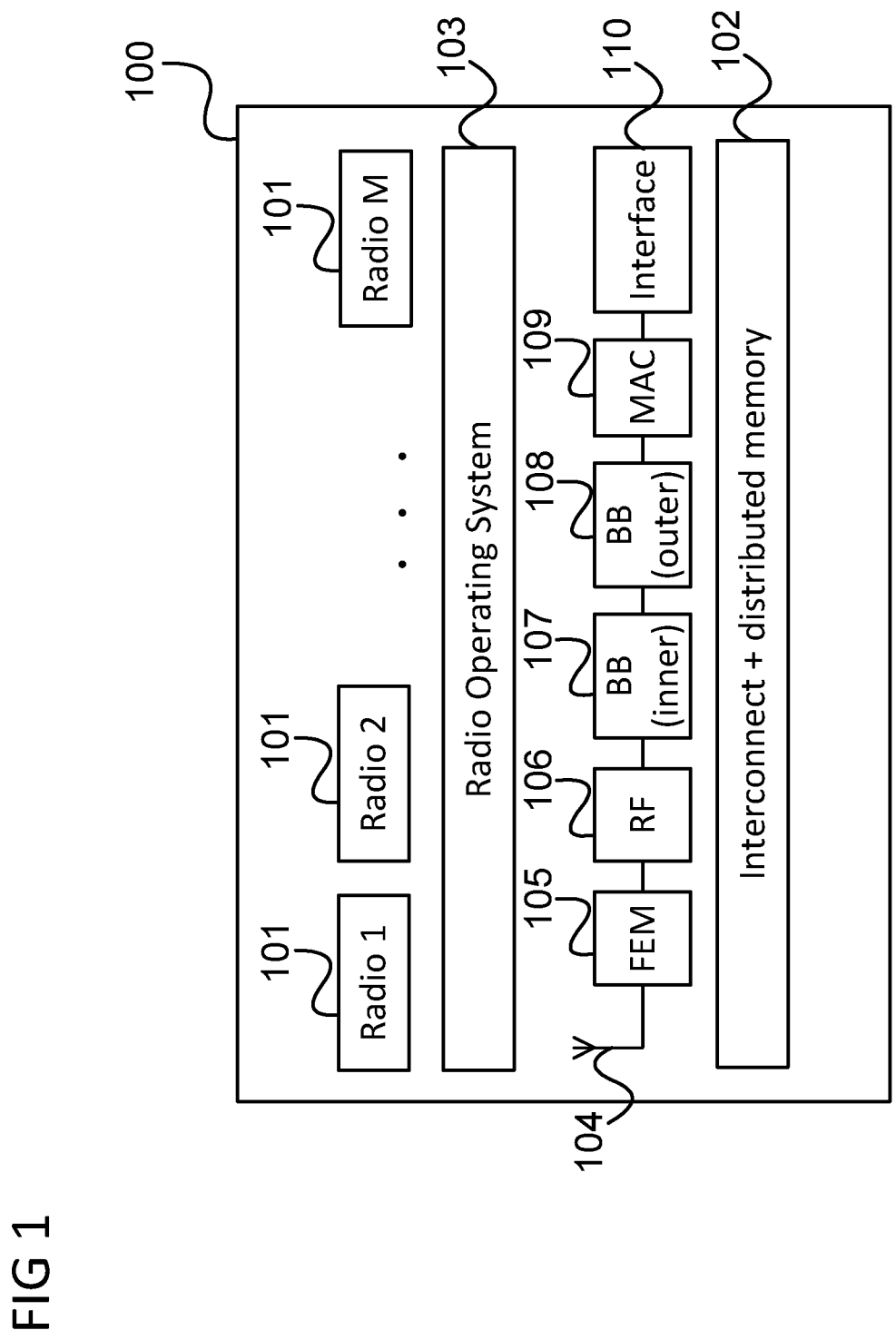
FIG. 1 shows a communication device according to an embodiment.

FIG. 1 shows a communication device 100 according to an embodiment.

The communication device 100 is a multi-radio communication device that may be seen as a computer (also referred to as radio computer) where individual radio applications 101 are engineered as software entities to run on general-purpose computing elements. This allows the communication device 100 to operate according to multiple radio systems (i.e. multiple radio communication technologies) in any combination in parallel.

The communication device 100 includes interconnections and a (e.g. distributed) memory 102 and is controlled by a radio operating system 103. The communication device 100 further includes a physical radio computing platform including one or more antennas 104, front-end modules (e.g. filters, power amplifiers, etc.) 105, a RF (radio frequency) transceiver 106, baseband processors for (de)modulation 107, baseband processors for (de-)coding 108, control processors for protocol stacks 109 and application interface units 110.

The radio applications 101 may correspond to radio application programs that are executed by the communication device and its radio operating system 103. Each radio application 101 may for example correspond to a radio communication technology and causes, when executed by the radio computer 100, the communication device 101 to operate according to this radio communication technology.

The communication device 100 may for example be supplied (e.g. via download) with a new radio application such that it may operate a new radio communication technology.

With a multitude of distinct communication standards being operated simultaneously, the verification/certification of a mobile device can be expected to become extremely difficult—it may even be expected that not all possible configurations can be verified any more due to the exponentially increasing number of possible parameterization cases for the simultaneous operation of multiple radio communication standards. Rather, the correct operation may be verified for a set a key features in all possible combinations, but a high number of other possible parameterization possibilities may remain unchecked.

For example, LTE (Long Term Evolution) is planned to have approximately 360 interoperability test cases. With n standards operating simultaneously, assuming they have a similar number of test cases and a full-blown validity check of all possible configurations is performed, a total of $360^n$ cases would need to be checked. For n=2 standards running simultaneously this amounts to approx. 130.000 cases. With n=3 standards running simultaneously, this amounts to approx. 46.500.000 cases. Apparently, it is impossible to perform such a number of corresponding tests.

Thus, device certification by verification of all possible parameterization set-ups as done in current communication device generations may not be possible for future communication devices operating a number of radio links simultaneously for all possible (combined) parameterization set-ups of all communication standards that are potentially operated simultaneously.

According to one embodiment, an a communication device performs a self-verification for ensuring a correct operation of the communication device for the parameterization possibilities which were not checked during the certification process. This is for example done complementary to the classical certification process which is limited to a reasonable number of cases. For example, an on-chip certification procedure is introduced for the validation of configurations that have not been evaluated in an original certification process.

A communication terminal according to one embodiment is described in the following with reference to FIG. 2.

Figure 2:
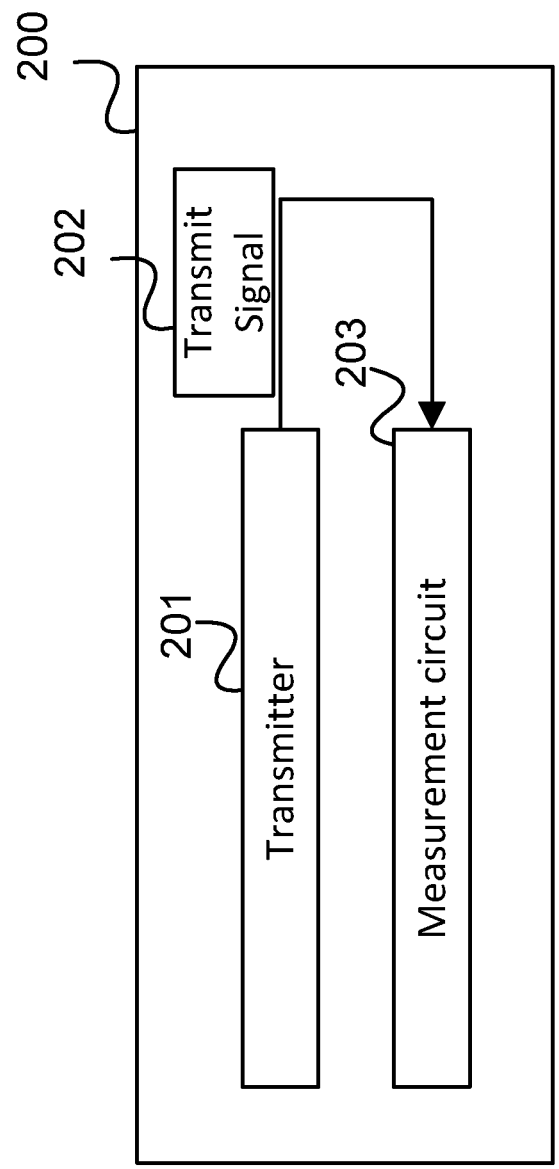
FIG. 2 shows a communication terminal according to an embodiment.

FIG. 2 shows a communication terminal 200 according to an embodiment.

The communication terminal 200 includes a transmitter 201 configured to generate a transmit signal 202.

The communication terminal 200 further includes a measurement circuit 203 configured to receive the generated transmit signal 202 and to measure the power of the received transmit signal in a predetermined frequency region.

In other words, illustratively, a communication terminal measures the power of a transmit signal (or of a signal based on the transmit signal, e.g. a processed version of the transmit signal, e.g. by at least part of a receiving path of the communication terminal) that has been generated by itself. The communication terminal may for example check whether the measured power fulfills a predetermined criterion, e.g. whether it is within a spectrum power mask, for example defined by a communication standard or spectrum usage regulations. The communication terminal may thus determine whether the transmit signal is in generated correctly (in terms of being in line with the spectrum power mask) and whether the radio communication technology according to which the transmit signal is generated is operating correctly in this regard and spectral power requirements (e.g. restrictions on the maximum power) are met. This can be seen as a self-verification of the communication terminal with regard to the correct operation of the radio communication technology.

The predetermined frequency region may be seen as a measuring frequency region that may for example include a part of the whole spectrum of the received transmit signal. The components of the received transmit signal may for example be extracted from the received transmit signal by a filter.

The generated transmit signal may be the transmit signal in the form as it would be supplied to the power amplifier of the transmitter (and then to the antenna) in case it should be sent out by the communication terminal. The generated transmit signal may also be the transmit signal in an earlier form in the transmit chain, e.g. the transmit signal in intermediate frequency, i.e. not yet converted to radio frequency.

The communication terminal 200 may for example be an SDR (software defined radio) communication device, for example in accordance with the architecture described with reference to FIG. 1.

According to embodiments, the communication terminal 200 may for example carry out in-band/out-band spectrum probing at fixed narrow-band parts of the spectrum, in-band/out-band spectrum probing through fixed narrow-band filtering network (e.g. inverse notch filtering network), in-band/out-band spectrum probing through a reconfigurable narrow-band filtering network (e.g. inverse notch filtering network), in-band/out-band spectrum probing through reconfigurable band-pass filtering network, filtering based switch-off of selected MD operational modes (and selection of different parameterization set-ups).

The spectrum probing may be network driven, i.e. initiated and/or requested by the network side of a communication system.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The communication terminal is for example a mobile communication device.

According to one embodiment, the transmit signal is a radio frequency transmit signal.

The measurement circuit may include a receiver configured to receive the generated transmit signal.

In one embodiment, the transmitter is configured to generate the transmit signal in accordance with a radio communication technology and the predetermined frequency region depends on the radio communication technology.

The communication terminal may further include a comparison circuit configured to compare the measured power with a predetermined threshold.

The threshold is for example given by a spectrum power mask.

According to one embodiment, the transmitter is configured to generate the transmit signal in accordance with a radio communication technology and the communication terminal includes a control circuit configured to control the communication terminal such that the transmission of signals generated in accordance with the radio communication technology is stopped if the measured power exceeds the predetermined threshold.

The communication terminal may further include a signaling circuit configured to signal a result of the measurement to a communication device.

In one embodiment, the measurement circuit is configured to measure the signal power in a plurality of separate predetermined frequency regions.

In one embodiment, the transmit signal is a radio frequency signal and the received transmit signal is the generated transmit signal, is the generated transmit signal converted to an intermediate frequency, is the generated transmit signal converted to a base band frequency, or is the generated transmit signal converted to a base band frequency and converted to digital.

In one embodiment, the transmit signal is a radio frequency signal and the measurement circuit is configured to convert the generated transmit signal to a plurality of different intermediate frequencies to generate a plurality of received transmit signals and to measure the power of each received transmit signal in the predetermined frequency region.

The measurement circuit for example includes a filter for extracting at least one frequency component of the received transmit signal corresponding to the predetermined frequency region and is configured to measure the power of the extracted frequency component. The filter is for example a band-pass filter, e.g. a narrow band pass filter such as an inverse notch filter. Other filter types may be used, e.g. a surface acoustic wave (SAW) filter. In digital domain, a signal may be processed using a Fourier transformation (e.g. an FFT) and the values in frequency comain corresponding to the frequency region may be used as a basis for the power measurement.

In one embodiment, the bandwidth of the predetermined frequency region is smaller than the bandwidth of the transmit signal. For example, the determined frequency region may be a part of the in-band frequency region of the transmit signal or the radio access technology according to which the transmit signal is generated. For example, an in-band frequency region corresponds to a frequency regions of low allowed transmit power and out-band region corresponds to a frequency region of high allowed transmit power (see for example FIGS. 6 and 7 as described below).

According to one embodiment it is assured that a communication device MD operates, also for the parameterization configurations which were not verified during a certification process, such that in particular the following is met:
1. When using a radio communication technology, the communication device emits transmit signals that are occupying the target spectrum following the corresponding radio communication technology specification. For example, the out-of-band emission limits are met in order to avoid any interference with neighboring systems;
2. When using a radio communication technology, the communication device emits transmit signals having a signal level that meets the output power requirements following the corresponding radio communication technology specification. This is typically important for avoiding interference in a band-sharing usage scenario (such as for WCDMA systems, etc.).

According to embodiments, this may be achieved by spectrum probing based on power level verification and adaptive filtering based power levels.

An embodiment in which spectrum probing based power level verification is used is described in the following with reference to the communication terminal architecture shown in FIG. 3.

Figure 3:
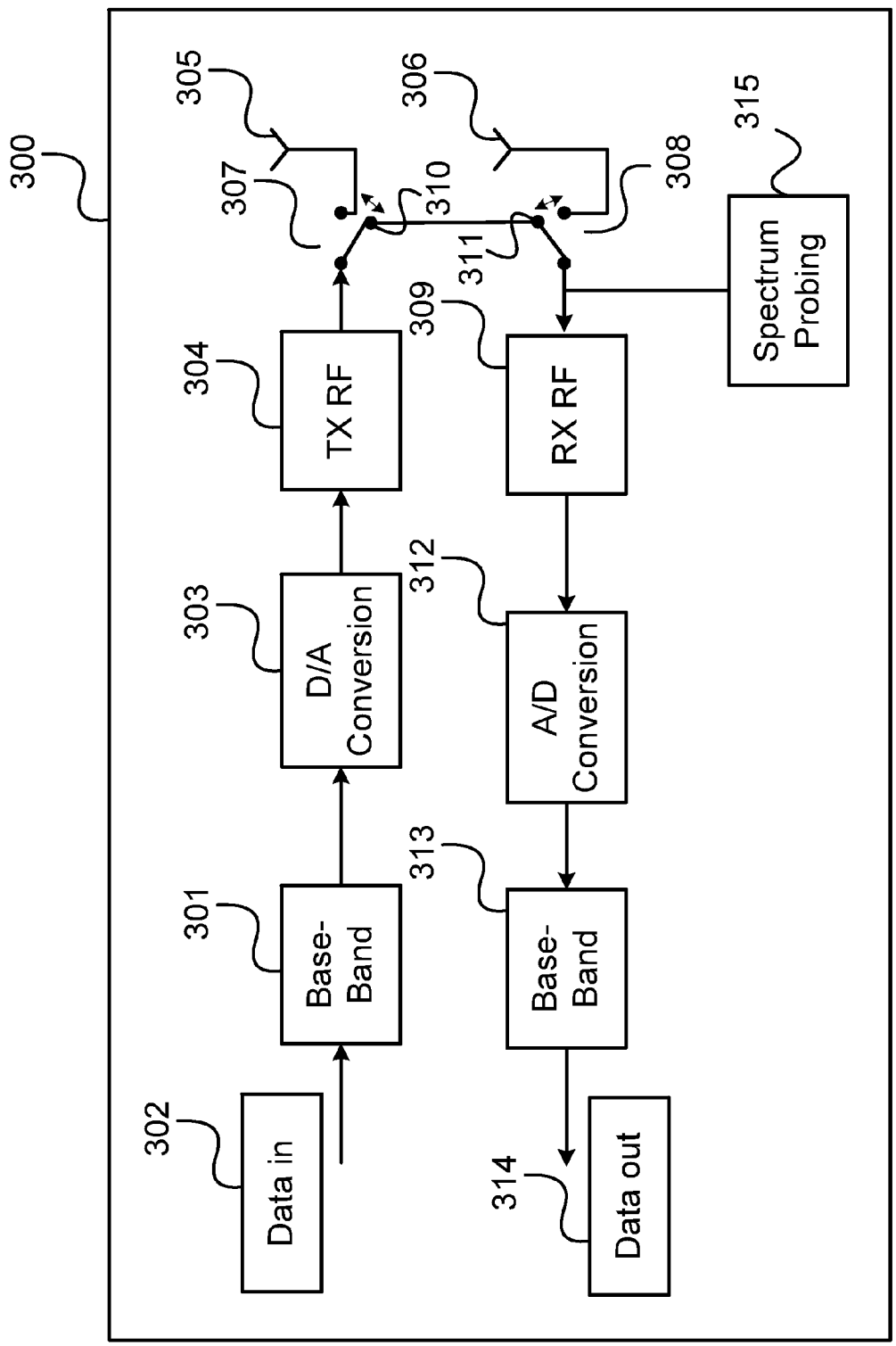
FIG. 3 shows a communication terminal according to an embodiment.

FIG. 3 shows a communication terminal 300 according to an embodiment.

The communication terminal 300 includes a transmitter base-band circuit 301 (e.g. a base band circuit for modulation and encoding) receiving input data 302. The transmitter base-band circuit 301 generates a base band signal supplied to a D/A conversion circuit 303 which converts the base-band signal to an analog signal that is supplied to a transmitter RF (radio frequency) circuit 304. The transmitter RF circuit 304 generates a transmit signal from the analog base band signal, e.g. by up-converting it to a radio frequency (e.g. via an intermediate frequency).

The communication terminal 300 further includes a transmit antenna 305 and a receiving antenna 306 (which may also be implemented by one shared antenna for both transmitting and receiving).

The transmitter RF circuit 304 may be connected by means of a first switch 307 to the transmit antenna 305 or may be connected by means of the first switch 307 to a terminal 310 of the first switch 307 which is coupled to a terminal 311 of the second switch 308.

The communication terminal 300 further includes a receiving RF circuit 309 that may be connected by the second switch 308 to the receiving antenna 306 or to the terminal 311 of the second switch 308.

The RF circuit 309 for example down-converts an RF signal that is received to a received base band signal (e.g. via an intermediate frequency) which it supplies to an A/D conversion circuit 312 which converts it into a digital base band signal. The communication device 300 further includes a receiver base band circuit 313 which generates output data 314 from the digital base band signal (e.g. by decoding and/or demodulation the digital base band signal).

By connecting the transmitter RF circuit 304 by means of the first switch 307 to the terminal 310 of the first switch 307 and connecting the receiver RF circuit 309 by means of the second switch 308 to the terminal 311 of the second switch 308, a feedback loop (also referred to as an internal loop-back) may be formed between the transmitter chain (including the transmitter base-band circuit 301, the D/A conversion circuit 303, and the transmitter RF circuit 304) and the receiver chain (including the receiver RF circuit 309, the A/D conversion circuit 312, and the receiver base band circuit 313) to form a chain in the communication terminal 300 including both the transmitter chain and the receiver chain.

The internal loop-back may for example be used for testing the correct operation of the communication terminal 300 by feeding back the transmit signal generated by the transmitter RF circuit 304 (i.e. the output signal of the transmitter chain) into the receiver chain and analyze the output data 314. For example, the output data 314 is compared with the input data 302 and thus an erroneous operation of the communication terminal 300 may be detected.

An idea on which this embodiment is based may be seen in introducing into the chain formed by loop-back (including both transmitter chain and transmitter chain) a spectrum probing device 315, i.e. to connect a spectrum probing device (that may be realized by a component of the communication device 300) to some point in the chain formed by the loop-back. The spectrum probing device 315 may for example be connected by a switch to the loop-back chain and may be connected using the switch when needed. For example, a switch may be arranged in the loop-back chain supplying the generated transmit signal (possibly processed by parts of the receiver chain) to the spectrum probing device 315 or to parts of the receiver chain for decoding (i.e. usual reception processing).

It should be noted that earlier forms of the transmit signal generated by the transmit chain may be fed back. For example, the transmit signal may be fed back (i.e. supplied to the receiver chain) before it is converted to radio frequency, e.g. when it is still in intermediate frequency form. Accordingly, the generated transmit signal may include an intermediate transmit signal, i.e. as an intermediate transmit signal generated by the transmitter chain that would be further processed (e.g. amplified or up-converted) before it would be sent out over the antenna 305.

As in the example shown in FIG. 3, the spectrum probing device may be connected to the analog domain, i.e. to a point in the chain formed by the loop-back in which the transmit signal (or the transmit signal received and possibly processed by the receiving chain) is in analog form. As illustrated in FIG. 2, this may be a point in which the transmit signal has not yet been processed by components of the receiving chain (i.e., in this example, before it has been supplied to the receiver RF circuit 309) such that the spectrum probing device 315 directly receives the transmit signal from the transmitter chain, i.e., in this example, directly from the transmitter RF circuit 301.

Alternatively, the spectrum processing device 315 may be connected to a point further down in the receiver chain, for example after some processing of the transmit signal received by the receiver chain, e.g. after its conversion to intermediate frequency or after its conversion to base band.

Figure 4:
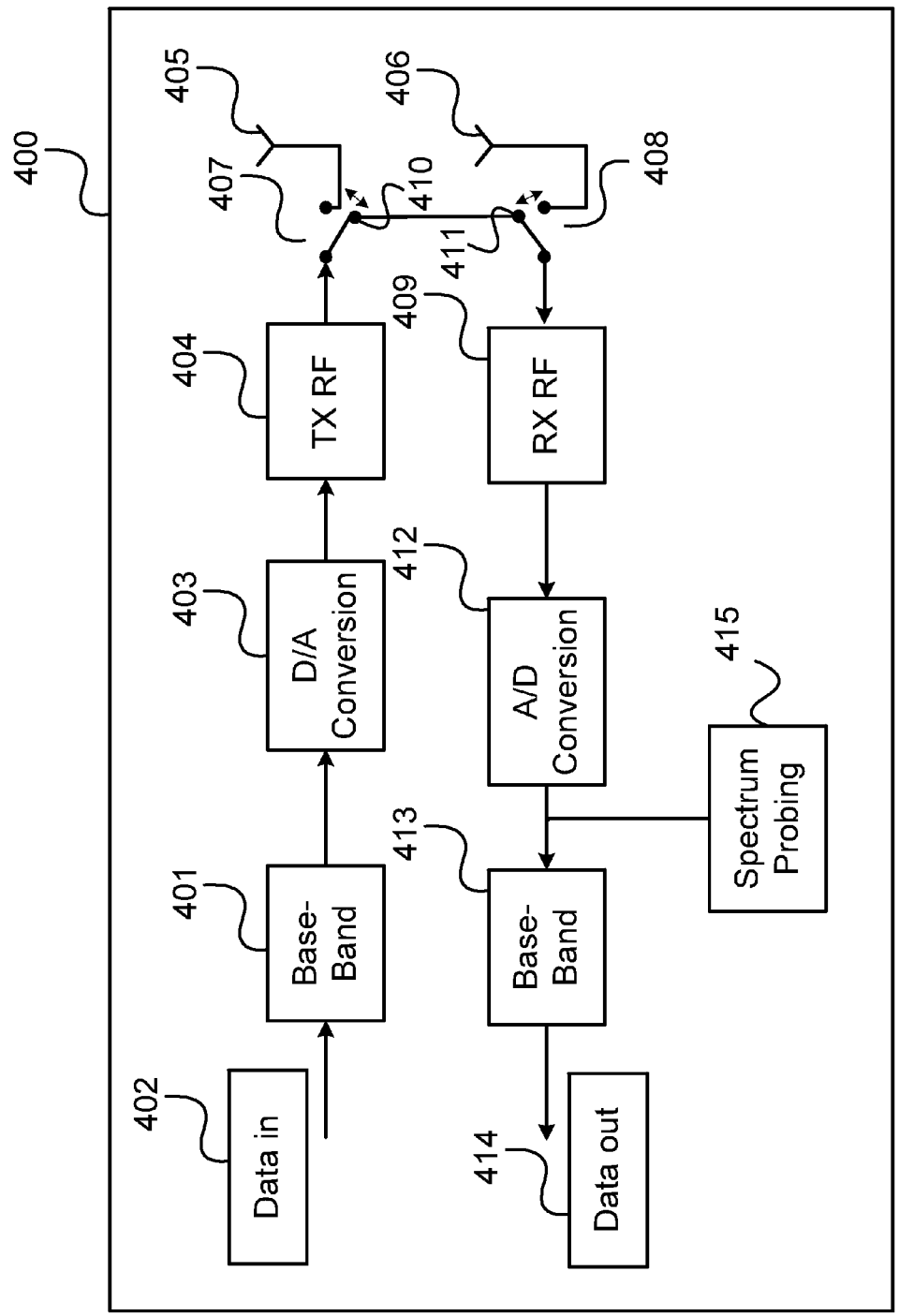
FIG. 4 shows a communication device according to an embodiment.

As illustrated in FIG. 4, the spectrum processing device 315 may also be connected to a point in the receiver chain in which the received transmit signal has been converted to digital domain.

FIG. 4 shows a communication device 400 according to an embodiment.

Analogously to the communication device 300 shown in FIG. 3, the communication device 400 includes a transmitter base band circuit 401 receiving input data 402 as input, a D/A converstion circuit 403, a transmitter RF circuit 404, a transmit antenna 405, a receiving antenna 406, a first switch 407, a second switch 408, a receiver RF circuit 409, an A/D conversion circuit 412, and a receiver base band circuit 413 generating output data 414.

A spectrum probing device 415 is in this example connected to a point after A/D conversion (in other words to the digital domain) between the A/D conversion circuit 412 and the receiver base band circuit 413.

The spectrum probing device 315, 415 together with the parts of the receiving chain processing the fed back transmit signal (i.e. the components of the receiving chain connected in front of the point to which the spectrum probing device 315, 415 is connected with respect to the transmitter RF circuit 304 from where the transmit signal is supplied) may be seen to form a measuring circuit that receives the generated and fed back transmit signal (e.g. by processing it in accordance with the parts of the receiving chain) and probes the received transmit signal, e.g. measures the power of the received transmit signal in a predetermined frequency region.

In one embodiment, the predetermined frequency region may include one or more (relatively) narrow frequency bands.

For example, the spectrum probing device 315, 415 includes a narrow-band filter (e.g. an inverse notch filter), extracting a very tight narrow-band signal from the received transmit signal.

Figure 5:
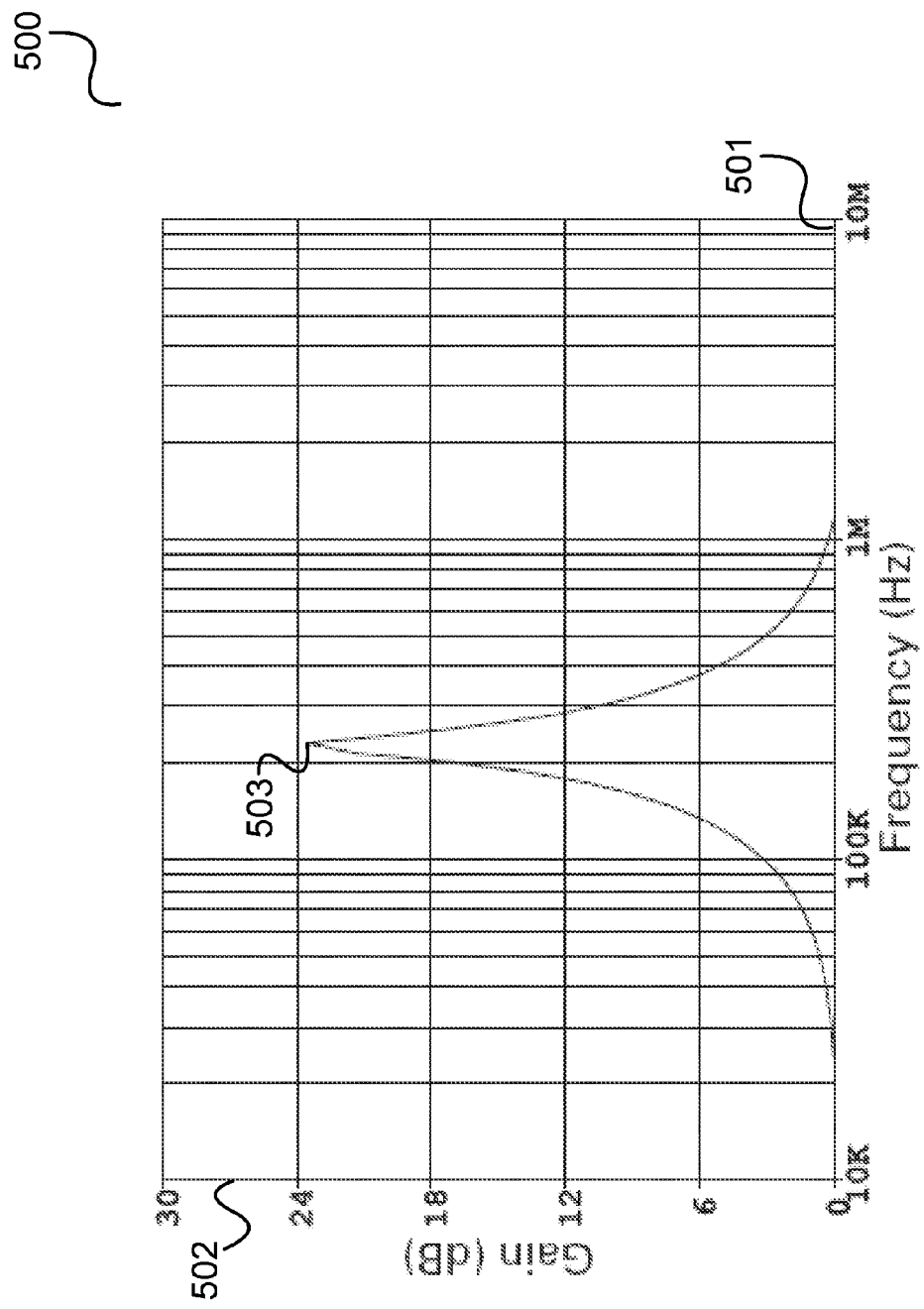
FIG. 5 shows a frequency-gain diagram of a filter according to an embodiment.

The gain of an inverse notch filter depending on the frequency that may be used according to an embodiment is illustrated in FIG. 5.

FIG. 5 shows a frequency-gain diagram 500 of a filter according to an embodiment. Frequency increases (logarithmically) from left to right along a first axis 501. The gain (in dB) increases from bottom to top along a second axis 502. The gain has a maximum 503 at a certain frequency that may be seen as the center frequency (or resonant frequency) of the filter.

According to one embodiment, the spectrum probing device 315, 415 realizes a plurality of such filters (e.g. notch filters with the behavior according to FIG. 5) such that the center frequences of the filters are positioned at selected (e.g. equidistant) frequency points over the frequency range supported by the communication terminal 300, 400.

Figure 6:
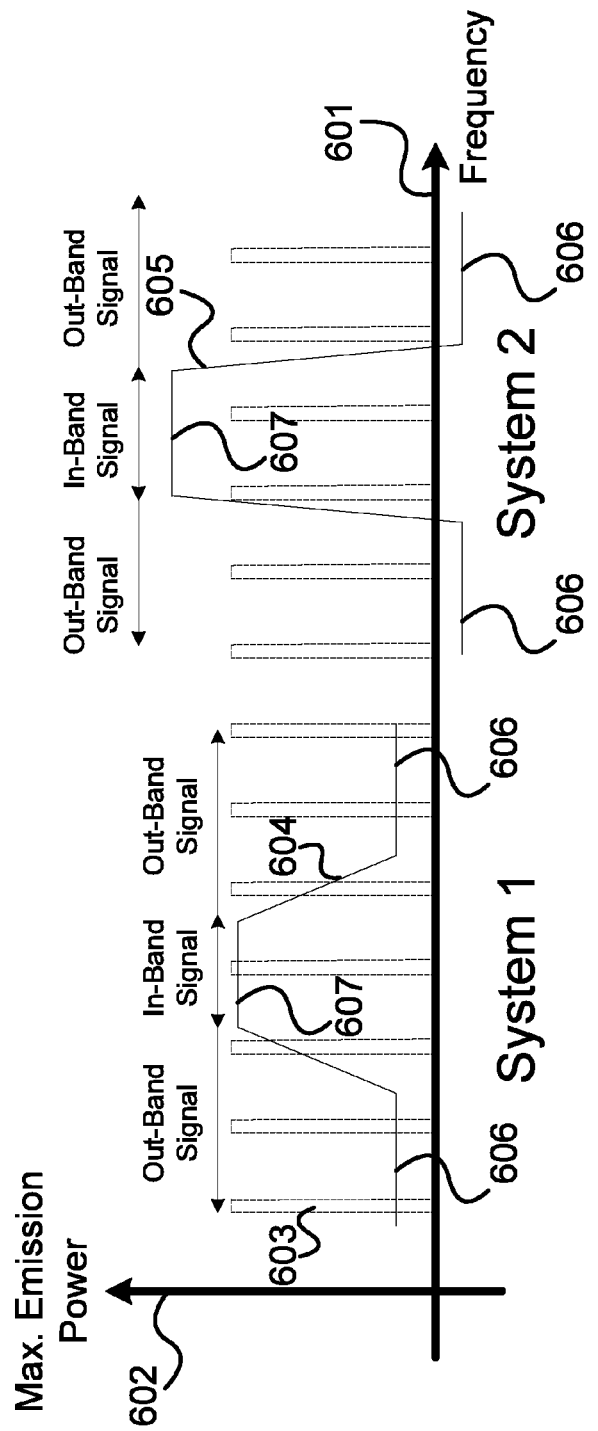
FIG. 6 shows a frequency-power diagram according to an embodiment.

An example for such a distribution of frequency points over the frequency range supported by the communication terminal 300 (in other words of a configuration of a plurality of filters with regard to the positioning of their center frequencies in the frequency range supported by the communication terminal 300) is illustrated in FIG. 6.

FIG. 6 shows a frequency-power diagram 600 according to an embodiment.

In the diagram 600, frequency increases from left to right along a first axis (frequency axis) 601. The illustrated frequency range for example corresponds to at least a part of the frequency range supported by the communication device 300, 400 and/or used by the communication device 300, 400 for one or more radio communication technologies used by the communication device 300, 400.

Signal power (and transmission gain for the filters) increases along a second axis 602 from bottom to top.

The frequency points of the frequency range at which the center frequencies of the filters are positioned are illustrated by the frequency responses (i.e. gains depending on frequency) of the filters. In this example, it is assumed that the filters have an ideal behaviour of an ideal narrow band pass filter, i.e. constant positive gain within a narrow contiguous frequency region and total cut off (i.e. gain zero) for frequencies outside this frequency region. Accordingly, the frequency responses are illustrated by (dashed) narrow rectangles 603.

The diagram 600 further shows a first spectrum power mask 604, for example with a first radio communication technology (indicated by "system 1"), and a second spectrum power mask 605, for example with a second radio communication technology (indicated by "system 2"). The spectrum power masks 604, 605 define the maximum allowed transmit signal power (or received transmit signal power in case the probing is done farther done in the receiving chain) for the covered frequency range. The spectrum power masks 604, 605 define frequency regions of low allowed transmit power 606 and frequency regions of high allowed transmit power 607. The frequency regions of low allowed transmit power that may be seen as out-band regions and the frequency regions of high allowed transmit power may be seen as in-band regions of the respective radio communication technology. Accordingly, transmit signals may be seen as out-band signals or in-band signals for the respective radio communication technology.

Each filter is used to extract a part of the fed back transmit signal at the narrow frequency band according to the positioning of its center frequency in the frequency range and the power of the extracted part is measured and compared to the spectrum power mask of the radio communication technology in accordance to which the transmit signal is generated to verify the correct operation of the radio communication technology. This is for example done for all the filters and may then be referred to as a probing step for a certain filter center frequency positioning.

Various probing steps may be carried out and the positioning of the center frequencies of the filters may be changed from probing step to probing step.

Figure 7:
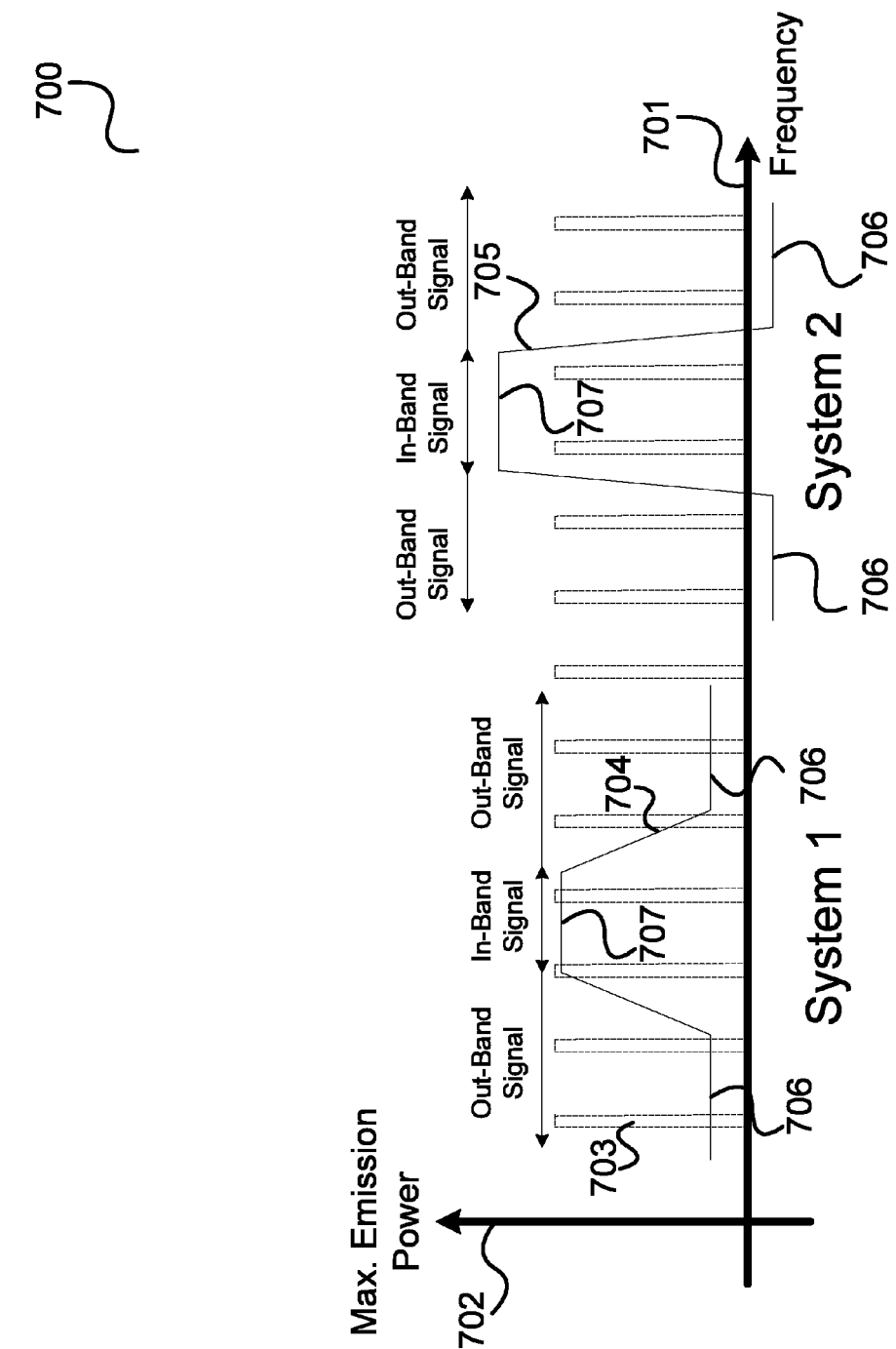
FIG. 7 shows a frequency-power diagram according to an embodiment.

For example, a first probing step is carried out with the positioning of filter frequencies as illustrated in FIG. 6 and a second probing step is carried out with the positioning of filter frequencies as illustrated in FIG. 7.

FIG. 7 shows a frequency-power diagram 700 according to an embodiment.

Analogously to the diagram 600 shown in FIG. 6, frequency increases from left to right along a first axis (frequency axis) 701 and signal power (and transmission gain for the filters) increases along a second axis 702 from bottom to top.

A first spectrum power mask 704 corresponding to the first spectrum mask 604 of FIG. 6 and a second spectrum power mask 705 corresponding to the second spectrum mask 605 of FIG. 6 are shown in the diagram 700. The spectrum power masks 704, 705 can be seen to define frequency regions of low allowed transmit power 706 and frequency regions of high allowed transmit power 707.

As in FIG. 6, the positioning of the center frequencies of the filters (please note that in case of a region with constant maximum gain as in this case where ideal filter behaviour is assumed the center frequency of a filter may be defined as the central frequency of the region with contant maximum gain) is indicated by dashed rectangulars 703.

It can be seen that the positioning of the center frequencies of the filters (or, in other words, the pass bands of the filters) is shifted with respect of the positioning illustrated in FIG. 6 such that overall, other frequency regions may be probed in the second probing step. This second probing step and, accordingly, the shifting of the center frequencies may be carried out optionally.

The change of positioning may be done by a corresponding reconfiguring of the filters but may also be performed by a corresponding shift of the frequency range (while keeping the center frequencies of the filters constant). For example, in an embodiment in which probing is done based on the received transmit signal being down-converted to intermediate frequency, the (relative) positioning of the filter center frequencies may be changed by changing the intermediate frequency. The shift of the frequency range may also be done by a mutliplication of the generated transmit signal before filtering it.

For the analogue case (i.e. for probing at a point where the fed back transmitted signal is analog form) the filters may be implemented by, e.g., inverse notch filters wherein each filter is implemented by a fixed implementation (in other words hard wired) or a limited set of inverse notch filters is used that may be configured for various frequencies (for example, in an extreme case just one single notch filter is provided which is adapted to the required center frequencies).

Each filter may be used over a predefined period of time in order to estimate an average power level on the respective narrow-band spectrum portion (corresponding to the pass band of the filter).

Following the signal strength detection results of the considered filters, the communication terminal may continue to operate the radio communication technologies if the power levels are in accordance with the specifications (e.g. with given spectrum power masks). Otherwise, in one embodiment, if the power level is not in accordance with the spectrum power mask of a radio communication technology, e.g. exceeds the spectrum power mask for some frequencies, the operation of the radio communication technology is interrupted. Consequently, the parameterization of the communication terminal may be changed, e.g. through selection of a different set of communication links.

Optionally, the communication network used by the communication terminal is informed about communication terminal configurations that lead to interfering spurious emission levels or too high in-band power levels.

An embodiment in which is based on adaptive filtering based power levels are used is described in the following.

The embodiment described in the following is based on the communication terminal architecture described with reference to FIGS. 3 and 4 including a spectrum probing device 315, 415 connected at the input of or at a point within the receiver chain.

Instead of the very narrow-band filters (e.g. notch filters), in this embodiment, adaptive band-pass filters are used in order to extract in-band and out-band power levels.

Figure 8:
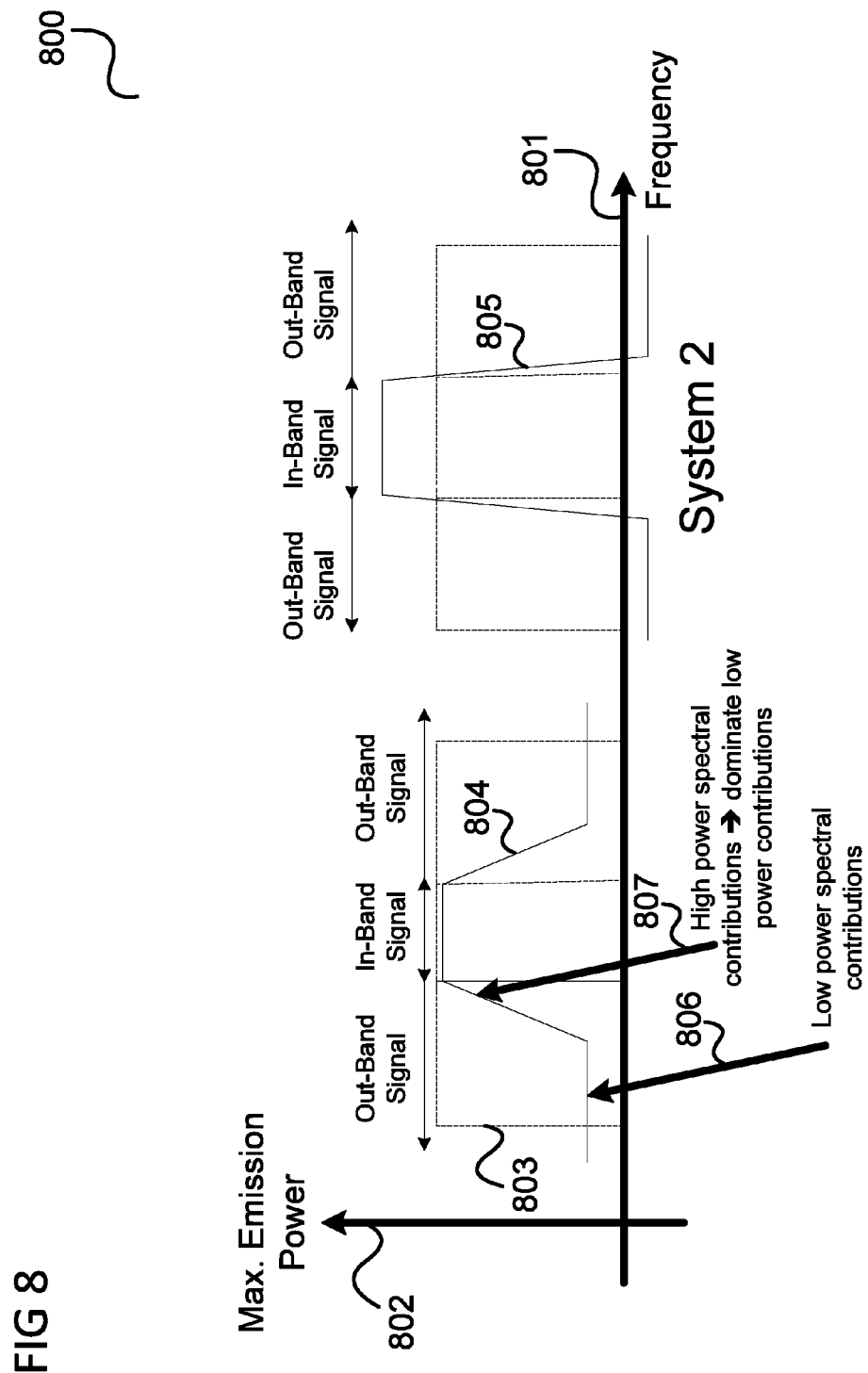
FIG. 8 shows a frequency-power diagram according to an embodiment.

This is illustrated in FIG. 8.

FIG. 8 shows a frequency-power diagram 800 according to an embodiment.

Analogously to the diagram 600 shown in FIG. 6, frequency increases from left to right along a first axis (frequency axis) 801 and signal power (and transmission gain for the filters) increases along a second axis 802 from bottom to top.

A first spectrum power mask 804, e.g. corresponding to the first spectrum mask 604 of FIG. 6 and a second spectrum power mask 805, e.g. corresponding to the second spectrum mask 605 of FIG. 6 are shown in the diagram 800.

As in FIG. 6, the positioning of the pass band of the filters (which is in this example of ideal filters the region of constant maximum gain and may in case of non-ideal filter behaviour correspond to a region where the gain is above a certain threshold) is indicated by dashed rectangulars 803. It should be noted that in this example the filters are chosen and/or configured such that they cover two frequency regions (e.g. positioned such that the in-band regions of the two radio access technologies are each located at the center of one of the frequency regions) wherein each of the two frequency regions is covered by three filters whose pass-bands are close, adjacent (as illustrated in FIG. 8) or even overlapping.

Similarly to the usage of narrow band-pass filters as described above with reference to FIGS. 6 and 7, this (wide) band pass filtering approach may be used in order to derive average power levels over the in-band and out-band parts of the transmit signal.

In one embodiment after filtering by one of the filters the power integral of the filtered signal is measured to measure the power of the received transmit signal for the frequency region corresponding to the filter (e.g. corresponding to the pass-band of the filter).

The band-pass filters may be configured such that similar power-levels are covered by one filter, i.e. such that a filter covers a frequency region in which, according to the respective power spectrum mask, the power of the transmit signal is about the same for all frequencies of the frequency region. Thus, it may be avoided that low power levels (as indicated by a first arrow 806 in FIG. 8) do not play any role in the overall measured power level of the signal output of a filter and the high power spectral contributions to the measured power (as indicated by a second arrow 807 in FIG. 8) dominate the contributions of other frequencies (it should be noted that in the illustration of FIG. 8, both frequency regions indicated by arrows 806, 807 would fall in the pass-band of the same filter and thus would be "averaged" in terms of the measured power). For example, it can thus be avoided that a signal component for a frequency that exceeds the spectral mask cannot be detected since its contribution are dominated by the high power spectral contributions. In other words, outliers in low frequency regions (e.g. in the frequency region indicated by the first arrow 806) could be missed.

Figure 9:
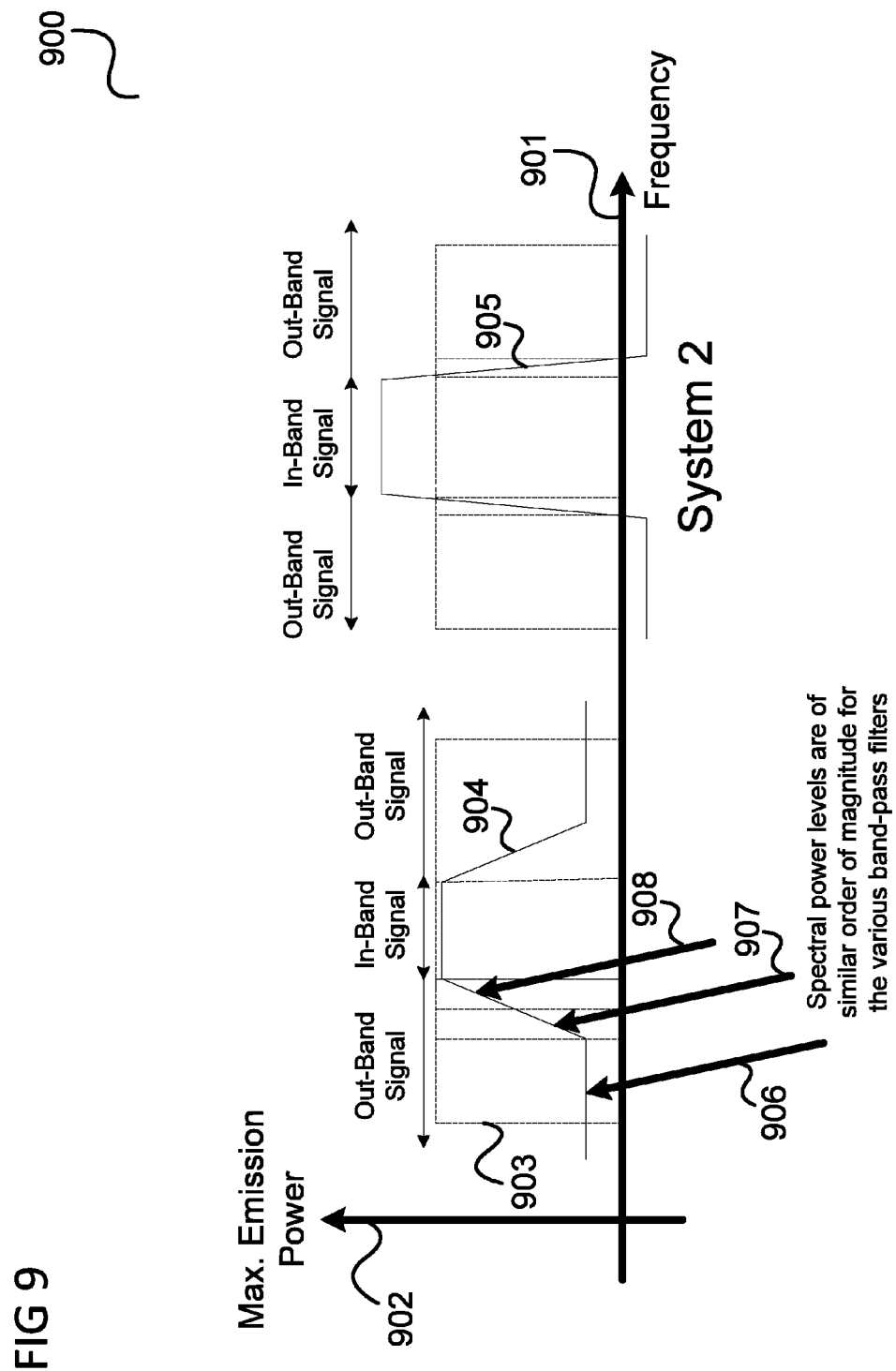
FIG. 9 shows a frequency-power diagram according to an embodiment.

For example, the pass-bands of the filters may be positioned as shown in FIG. 9 to avoid the undetected violation of the spectrum power mask in low frequency regions.

FIG. 9 shows a frequency-power diagram 900 according to an embodiment.

Analogously to the diagram 800 shown in FIG. 8, frequency increases from left to right along a first axis (frequency axis) 901 and signal power (and transmission gain for the filters) increases along a second axis 902 from bottom to top.

A first spectrum power mask 904 corresponding to the first spectrum mask 804 of FIG. 8 and a second spectrum power mask 905 corresponding to the second spectrum mask 805 of FIG. 8 are shown in the diagram 900.

As in FIG. 8, the positioning of the pass band of the filters is indicated by dashed rectangulars 903.

As indicated by arrows 906, 907, 908 the band-pass regions of the filters are positioned such that each filter covers a frequency region in which, in accordance with the respective spectrum power mask, the power levels of the transmit signal components corresponding to the various frequencies in this frequency region are similar (in case of operation in accordance with the spectrum power mask) such that it can be avoided that a violation for a frequency with low allowed maximum transmit power is masked by transmit signal components with high allowed maximum transmit power.

It should be noted that the usage of a plurality of narrow band-pass filters (e.g. an inverse fixed notch-filter network or filter bank) allows the usage of a single hard-wired (non or only slightly reconfigurable) circuit for all possible configurations of the communication terminal with regard to the communication technologies used. With the (wide) band-pass filtering approach, some reconfigurable filter implementation may need to be included. Typically, reconfigurable filters have a lack in selectivity and therefore a fixed notch filter approach may be used depending on the implementation constraints.

In one embodiment a communication network used by the communication terminal (e.g. to which the communication terminal has communication connections using one or more of the various radio technologies) is able to request the communication terminal to carry out measurements (e.g. one or more measurements for certain regions of the spectrum, in other words one or more spectrally local power measurements), for example in reaction of the detection of interference by the communication network.

A communication device, e.g. a network component, according to one embodiment is described in the following with reference to FIG. 10.

Figure 10:
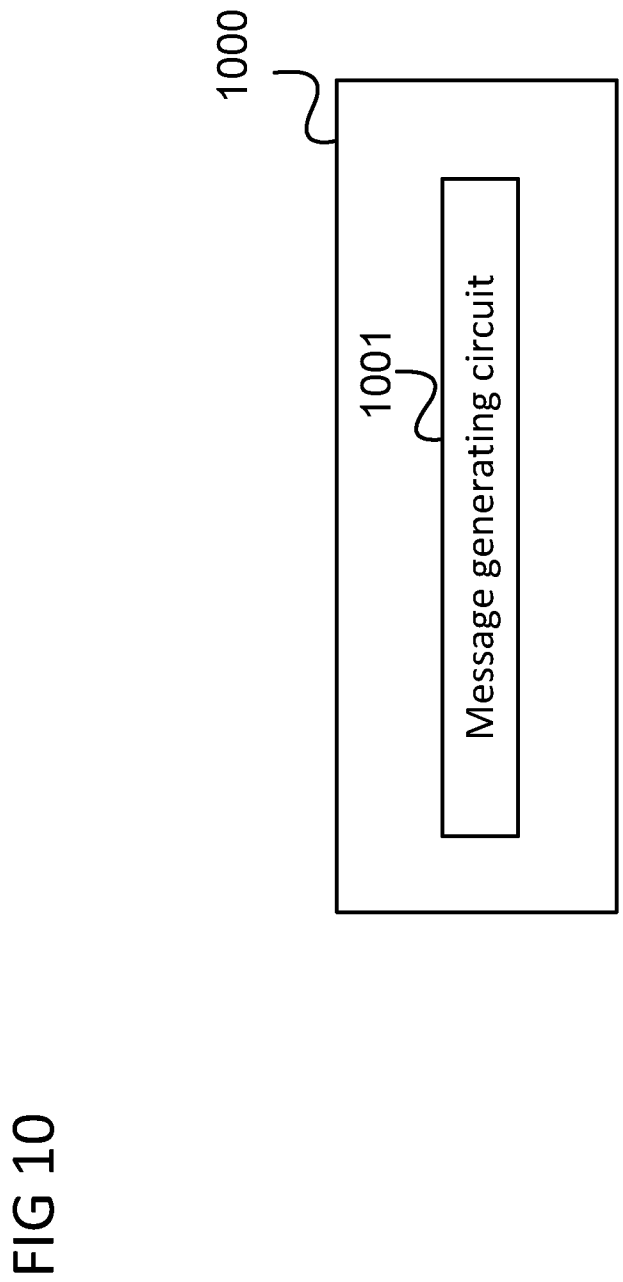
FIG. 10 shows a communication device according to an embodiment.

FIG. 10 shows a communication device 1000 according to an embodiment.

The communication device 1000 includes a message generating circuit 1001 configured to generate a message specifying a request for a communication terminal to control a measurement circuit of the communication terminal to receive a transmit signal generated by the communication terminal and to measure the power of the received transmit signal in a predetermined frequency region.

In one embodiment, in other words, a communication device (e.g. part of the network side) may request a communication terminal to do a power measurement of a transmit signal that the communication terminal has generated. It should be noted that in one embodiment, the functionality of the communication device and possibly additional functionalities, as the one described below, may be provided by an arrangement of communication network components or, in other words, a communication arrangement of a communication network.

The communication device may further include a receiver configured to receive a result of the measurement from the communication terminal.

According to one embodiment, the communication device further includes a determining circuit configured to determine, based on the result, whether a configuration of the communication terminal according to which the communication terminal has generated the transmit signal is an allowed configuration of the communication terminal.

The communication device may further include a memory storing that the configuration is an allowed configuration, if it is determined that the configuration is an allowed configuration.

According to one embodiment, the communication device further includes a memory storing for at least one communication terminal configuration whether the communication terminal configuration is an allowed configuration; a checking circuit configured to check, for a requested configuration for the communication terminal, whether it is stored in the memory that the requested configuration for the communication terminal is an allowable configuration; and a controlling circuit configured to control the message generating circuit to generate a message specifying a request for the communication terminal to control a measurement circuit of the communication terminal to receive a transmit signal generated by the communication terminal and to measure the power of the received transmit signal in a predetermined frequency region if it is not stored in the memory that the requested requested configuration for the communication terminal is an allowable configuration.

According to one embodiment, the measuring circuit is configured to generate the message in response to a detected interference in the frequency region. The communication device may for example include a detector for detecting an interference in the frequency region or may be configured to receive a message specifying whether there is interference in the frequency region.

The communication device is for example part of communication network providing a communication connection for the communication terminal. For example, the communication device is a base station of the communication network.

It should be noted that embodiments described in context of the communication terminal are analogously valid for the communication device and vice versa (the same holds for corresponding methods of operation of these devices).

An example of an operation of a communication network (e.g. of the communication device 1000 and, possibly, additional componpents of the communication network) according to an embodiment is described in the following with reference to FIG. 11.

Figure 11:
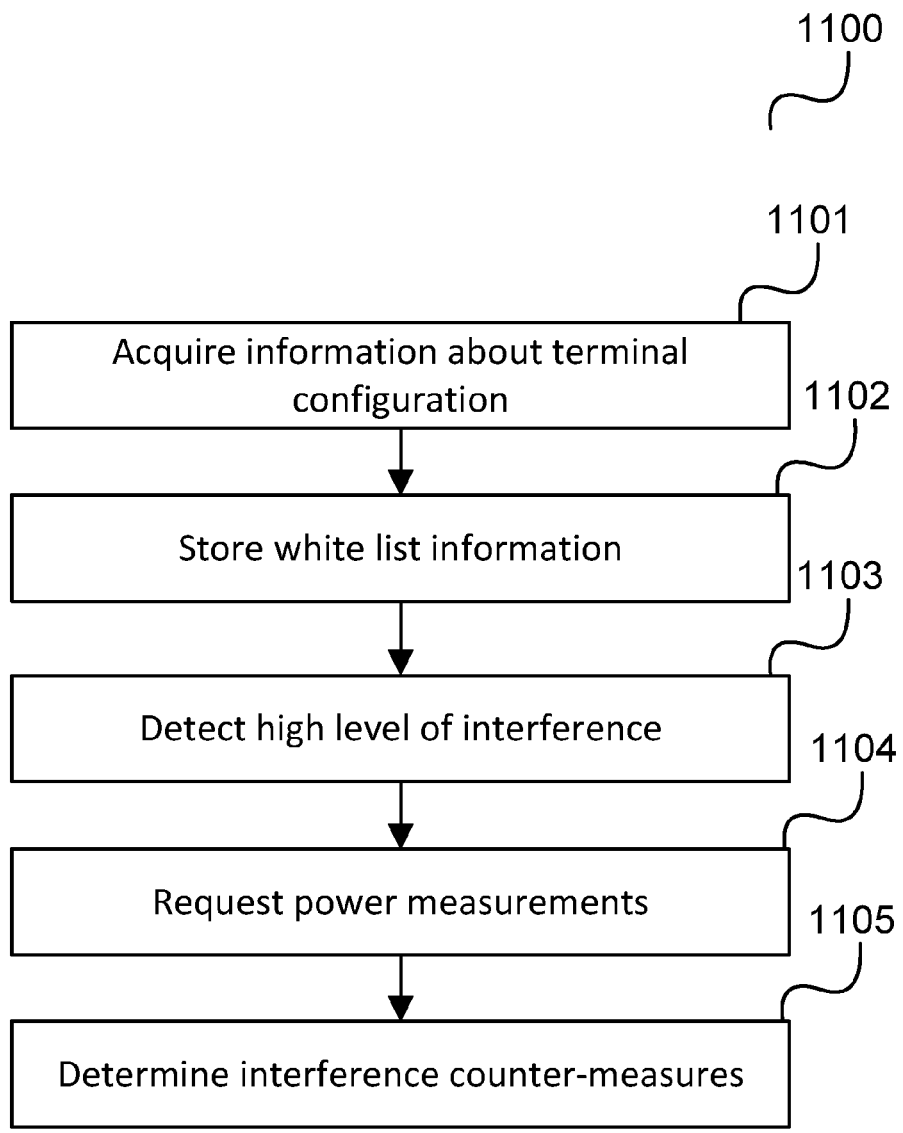
FIG. 11 shows a flow diagram according to an embodiment of the invention.

FIG. 11 shows a flow diagram according to an embodiment of the invention.

In 1101, the communication network acquires information about a communication terminal configuration, e.g. about a configuration according to which a plurality of radio communication technologies are used in parallel, (wherein each radio communication technology is used according to a certain parameterization). The information may for example include whether this configuration works correctly, i.e. whether a communication terminal configured in accordance with this operation does not violate any spectrum power masks. This information may for example be acquired based measurements carried out by some (e.g. a few) communication terminals operating in accordance with this configuration.

In this example, it is assumed that based on the acquired information, the communication network assumes that communication terminal operating in accordance with the configuration can be expected to work correctly.

In 1102, the communication network stores the information that communication terminal operating in accordance with the configuration can be expected to work correctly. For example, a component of the communication network has a memory implementing a data base for storing this information. This is illustrated in FIG. 12.

Figure 12:
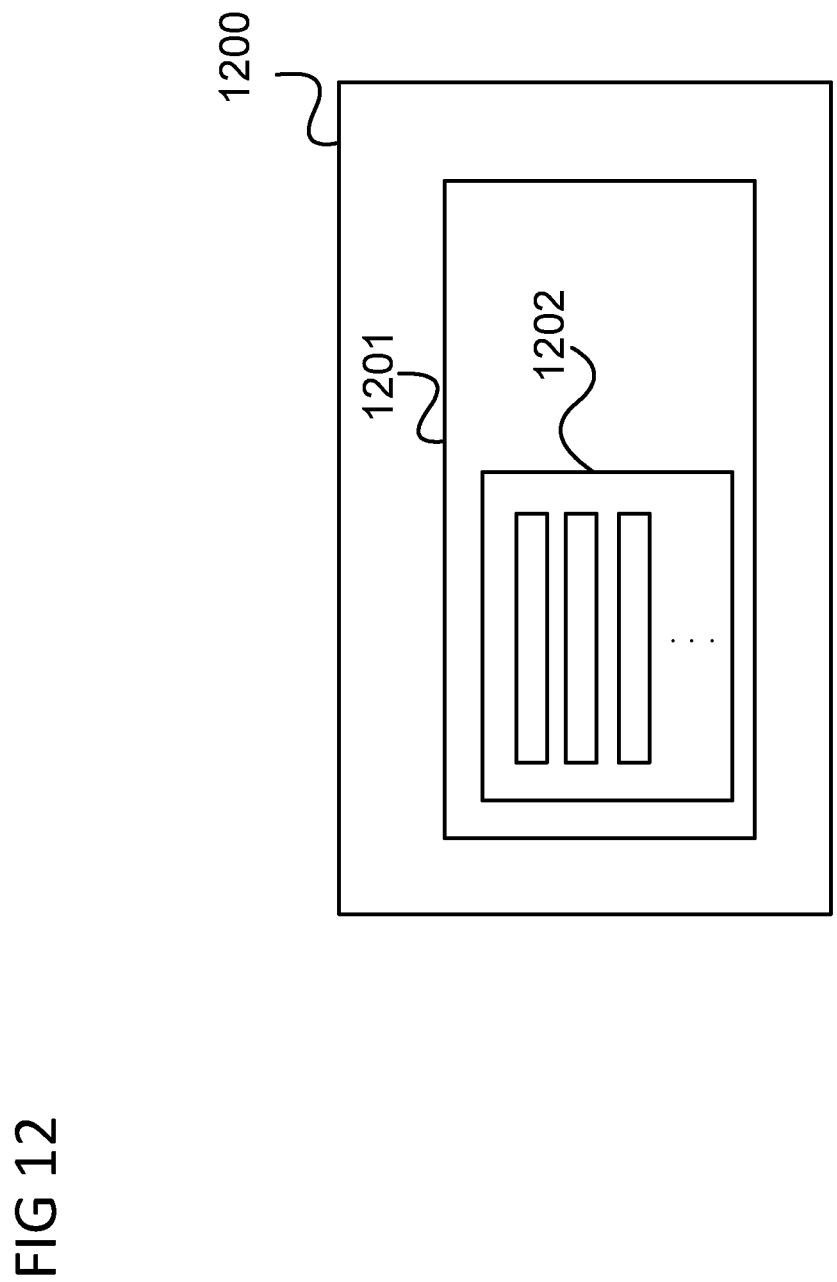
FIG. 12 shows a communication device according to an embodiment.

FIG. 12 shows a communication device 1200 according to an embodiment.

The communication device 1200 may for example have the functionality of the communication device 1000 described with reference to FIG. 10. Alternatively, it may be a separate component of the communication network.

The communication device 1200 includes a memory 1201 implementing a database for storing information about communication terminal configurations. The memory 1201 may for example store a white list 1202 of configurations that specifies configurations which are assumed by the communication network to work correctly, i.e. for which it is assumed that communication terminals operating in accordance with such a configuration do not violate spectrum power masks.

It should be noted that 1101 and 1102 are optional and are for example used for an initial decision whether a communication terminal is allowed to use a configuration.

It is assumed that in 1103, the communication network detects a high level of interference, e.g. noise etc.

In 1104, the communication network requests local spectrum power measurements of a communication terminal, e.g. one or more communication terminals that might be the cause for the interference. The communication terminal is for example requested to perform a self-verification by spectrum probing as described above.

In 1105, the communication network receives results about the measurements and decides whether and how the interference can be reduced or removed. For example, the communication network determines based on the measurements that the communication terminal is violating a spectrum power mask for a certain frequency region and thus generates interference. The communication network may in this case request the communication terminal to change its configuration, e.g. to stop operation of a certain radio communication technology or change operation parameters.

The communication network may for example request the communication terminal to perform a measurement for a certain frequency region corresponding to the frequency region in which interference is observed. This is illustrated in FIG. 13.

Figure 13:
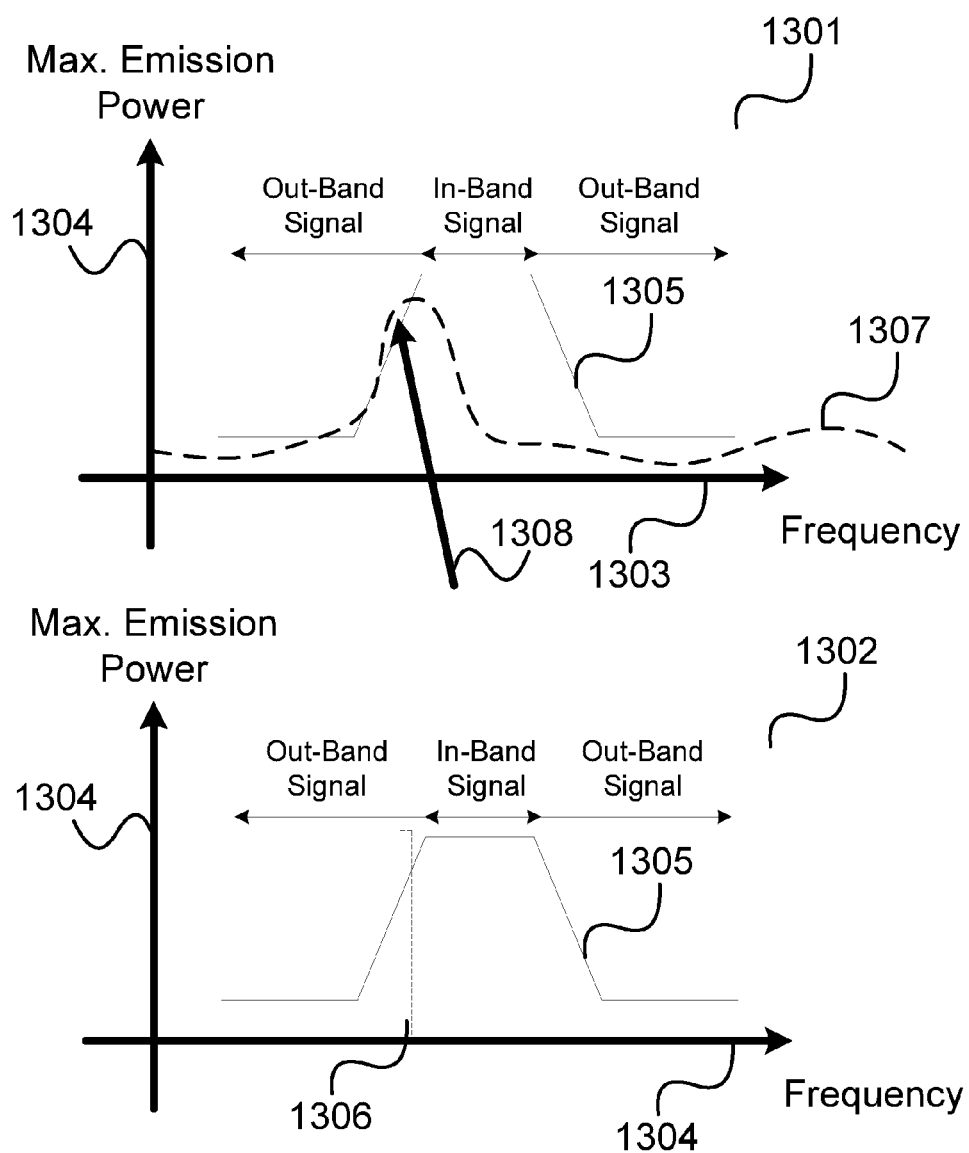
FIG. 13 shows a first frequency-power diagram and a second frequency-power diagram according to an embodiment.

FIG. 13 shows a first frequency-power diagram 1301 and a second frequency-power diagram 1302 according to an embodiment.

Analogously to the diagram 600 shown in FIG. 6, frequency increases from left to right along a first axis (frequency axis) 1303 and signal power (and transmission gain for the filters) increases along a second axis 1304 from bottom to top in the diagrams 1301, 1302.

A spectrum power mask 1305, e.g. corresponding to the first spectrum mask 604 of FIG. 6 is shown in the diagrams 1301, 1302.

As in FIG. 6, the positioning of the band-pass region of a filter is indicated by a dashed rectangular 1306 in the second diagram 1302.

A dashed line 1307 indicates the power level of a transmit signal generated according to the radio communication technology corresponding to the spectrum power mask 1305 received by the communication network.

The communication network detects that the received transmit signal violates the spectrum power mask 1306, as indicated by arrow 1308 in the first diagram 1301.

Accordingly, the communication network may request a communication terminal to perform a measurement for the frequency region corresponding to the violation 1308, e.g. by using a filter with a band-pass region as illustrated in the second diagram 1302 by the rectangular 1306.

An example of a communication between the communication network and communication terminals is shown in FIG. 14.

FIG. 14 shows a message flow diagram 1400 according to an embodiment.

The message flow takes place between a first communication terminal 1401, a second communication terminal 1402, and a communication network 1403.

In 1404, the first communication terminal 1401 sends a first request message 1405 to the communication network 1403 to request from the communication network 1403 to be allowed to use a certain configuration, that is for example specified in the first request message 1405.

It is assumed that the communication network 1403 does not have stored that the configuration can be expected to operate correctly. Accordingly, in 1406, the communication network transmits a second request message 1407 to the first communication terminal 1401 specifying that the first communication terminal 1401 should perform a self-verification for the configuration.

In 1408, the first communication terminal carries out a self-verification for the configuration, e.g. as described above.

In 1409, the first communication terminal transmits a result message 1410 to the communication network 1403. The evaluation of the measurement results (i.e. the test based on the measurements whether the spectrum power mask is violated, e.g. a comparison of the power measurements with the spectrum power mask) may be carried out on the side of the first communication terminal 1401 and/or on by the communication network 1403. It is assumed in this example that the self-verification was successful, i.e. that the configuration operates correctly.

Accordingly, the communication network 1403 transmits in 1411 a first acknowledgement message 1412 to the first communication terminal 1401 allowing usage of the configuration.

Further, in 1413, the communication network 1403 stores the information that the configuration can be expected to operate correctly, e.g. in a white list 1202 as described with reference to FIG. 12.

It is assumed that in 1414, the second communication terminal 1402 sends a third request message 1415 to the communication network 1403 to request from the communication network 1403 to be allowed to use a the configuration.

Since the communication network 1403 has stored the information that the configuration can be expected to operate correctly, the communication network 1403 sends in 1416 a second acknowledgement message 1417 allowing the second communication terminal 1402 to use the configuration.

According to one embodiment, a method for transmitting a transmit signal by a communication system includes checking whether the sending of the transmit signal by the communication system is within a pre-determined limit of interference to another communication system; and if it is determined that the sending of the transmit signal is not within the pre-determined limit controlling the communication system to not send the transmit signal.

The pre-determined limit is for example a spectral power mask. For example, if it is determined that the sending of the transmit signal is not within the pre-determined limit, a communication device of the communication system is controlled to not send the transmit signal or to stop sending of the transmit signal. For example, the communication device is controlled to quit operation of the radio access technology according to which the transmit signal is (or would be) generated and sent.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
 a transmitter configured to generate a transmit signal having a bandwidth;
 a receiver configured to selectively receive an external transmission signal or the generated transmit signal;
 a measurement circuit coupled to the receiver and configured to receive the generated transmit signal and to measure the power of the received transmit signal in a plurality of predetermined frequency regions within the bandwidth of the transmit signal, wherein the predetermined frequency regions in which the power is measured do not overlap each other; and
 a comparison circuit configured to compare the measured power in the predetermined frequency regions to a spectrum power mask;
 wherein the transmit signal is a radio frequency signal and wherein the measurement circuit is configured to convert the generated transmit signal to a plurality of different intermediate frequencies to generate a plurality of received transmit signals and to measure the power of each received transmit signal in the predetermined frequency regions.

2. The communication terminal of claim 1, being a mobile communication device.

3. The communication terminal of claim 1, wherein the transmit signal is a radio frequency transmit signal.

4. The communication terminal of claim 1, wherein the measurement circuit comprises a receiver configured to receive the generated transmit signal.

5. The communication terminal of claim 1, wherein the transmitter is configured to generate the transmit signal in accordance with a radio communication technology and wherein the predetermined frequency region depends on the radio communication technology.

6. The communication terminal of claim 1, wherein the transmitter is configured to generate the transmit signal in accordance with a radio communication technology and wherein the communication terminal comprises a control circuit configured to control the communication terminal such that the transmission of signals generated in accordance with the radio communication technology is stopped if the measured power exceeds a predetermined threshold given by the power spectrum mask.

7. The communication terminal of claim 1, further comprising a signaling circuit configured to signal a result of the measurement to a communication device.

8. The communication terminal of claim 1, wherein the transmit signal is a radio frequency signal and wherein the received transmit signal is the generated transmit signal, is the generated transmit signal converted to an intermediate frequency, is the generated transmit signal converted to a base band frequency, or is the generated transmit signal converted to a base band frequency and converted to digital.

9. The communication terminal of claim 1, wherein the measurement circuit comprises a filter for extracting at least one frequency component of the received transmit signal corresponding to one of the predetermined frequency regions and is configured to measure the power of the extracted frequency component.

10. The communication terminal of claim 9, wherein the filter is an inverse notch filter.

11. Method for measuring a signal comprising:
 generating a transmit signal in a communication terminal having a bandwidth;
 receiving the generated transmit signal in a receiver of the communication terminal, the receiver configured to selectively receive an external transmission signal or the transmit signal;
 measuring, by a measurement circuit of the communication terminal, the measurement circuit being coupled to the receiver, the power of the received transmit signal in a plurality of predetermined frequency regions within the bandwidth of the transmit signal,
 wherein the predetermined frequency regions in which the power is measured do not overlap each other;
 and comparing the power in the predetermined frequency regions to a spectrum power mask;
 wherein the transmit signal is a radio frequency signal and wherein the measurement circuit is configured to convert the generated transmit signal to a plurality of different intermediate frequencies to generate a plurality of received transmit signals and to measure the power of each received transmit signal in the predetermined frequency regions.

12. A communication device comprising:
 a message generating circuit configured to generate a message specifying a request for a communication terminal to control a measurement circuit of the communication terminal, the measurement circuit being coupled to a receiver of the communication terminal selectively configured to receive an external transmission signal or a transmit signal generated by the communication terminal having a bandwidth, to receive the transmit signal and to measure the power of the received transmit signal in a plurality of predetermined frequency regions within the bandwidth of the transmit signal, wherein the predetermined frequency regions in which the power is measured do not overlap each other, and to control a comparison circuit of the communication terminal to compare the power in the predetermined frequency regions to a spectrum power mask;
 wherein the transmit signal is a radio frequency signal and wherein the measurement circuit is configured to convert the generated transmit signal to a plurality of different intermediate frequencies to generate a plurality of received transmit signals and to measure the power of each received transmit signal in the predetermined frequency regions.

13. Communication device according to claim 12, comprising a receiver configured to receive a result of the measurement from the communication terminal.

14. Communication device according to claim 13, further comprising a determining circuit configured to determine, based on the result, whether a configuration of the communication terminal according to which the communication terminal has generated the transmit signal is an allowed configuration of the communication terminal.

15. Communication device according to claim 14, further comprising a memory storing that the configuration is an allowed configuration, if it is determined that the configuration is an allowed configuration.

16. Communication device according to claim 12, further comprising
 a memory storing for at least one communication terminal configuration whether the communication terminal configuration is an allowed configuration;
 a checking circuit configured to check, for a requested configuration for the communication terminal, whether it is stored in the memory that the requested configuration for the communication terminal is an allowable configuration; and
 a controlling circuit configured to control the message generating circuit to generate a message specifying a request for the communication terminal to control a measurement circuit of the communication terminal to receive a transmit signal generated by the communication terminal and to measure the power of the received transmit signal in a predetermined frequency region if it is not stored in the memory that the requested configuration for the communication terminal is an allowable configuration.

17. Communication device according to claim 12, wherein the measuring circuit is configured to generate the message in response to a detected interference in the frequency region.

18. Communication device according to claim 12, being part of communication network providing a communication connection for the communication terminal.

19. Communication device according to claim 18, being a base station of the communication network.

20. A method for requesting a measurement comprising:
 generating a message specifying a request for a communication terminal to control a measurement circuit of the communication terminal, the measurement circuit being coupled to a receiver of the communication terminal selectively configured to receive an external transmission signal or a transmit signal generated by the communication terminal having a bandwidth, to receive the transmit signal and to measure the power of the received transmit signal in a plurality of predetermined frequency regions within the bandwidth of the transmit signal, wherein the predetermined frequency regions in which the power is measured do not overlap each other, and to control a comparison circuit of the communication terminal to compare the power in the predetermined frequency regions to a spectrum power mask;
 wherein the transmit signal is a radio frequency signal and wherein the measurement circuit is configured to convert the generated transmit signal to a plurality of different intermediate frequencies to generate a plurality of received transmit signals and to measure the power of each received transmit signal in the predetermined frequency regions.

21. A method for transmitting a transmit signal by a communication system comprising:
 checking by a measurement circuit of the communication system whether sending of the transmit signal by the communication system is within a pre-determined limit of interference to another communication system, the measurement circuit being coupled to a receiver of the communication system selectively configured to receive an external transmission signal or a transmit signal generated by the communication system having a bandwidth and to measure the power of the received transmit signal in a plurality of predetermined frequency regions within the bandwidth of the transmit signal, wherein the predetermined frequency regions in which the power is measured do not overlap each other; and
 comparing by a comparison circuit of the communication system of the power in the predetermined frequency regions to a spectrum power mask;
 if it is determined that the sending of the transmit signal is not within the pre-determined limit, controlling the communication system to not send the transmit signal;
 wherein the transmit signal is a radio frequency signal and wherein the measurement circuit is configured to convert the generated transmit signal to a plurality of different intermediate frequencies to generate a plurality of received transmit signals and to measure the power of each received transmit signal in the predetermined frequency regions.

22. A communication device comprising:
 a message generating circuit configured to generate a message specifying a request for a communication terminal to control a measurement circuit of the communication terminal a transmit signal generated by the communication terminal and to measure the power of the received transmit signal in a predetermined frequency region;
 a memory storing for at least one communication terminal configuration whether the communication terminal configuration is an allowed configuration;
 a checking circuit configured to check, for a requested configuration for the communication terminal, whether it is stored in the memory that the requested configuration for the communication terminal is an allowable configuration; and
 a controlling circuit configured to control the message generating circuit to generate a message specifying a request for the communication terminal to control a measurement circuit of the communication terminal to receive a transmit signal generated by the communication terminal and to measure the power of the received transmit signal in a predetermined frequency region if it is not stored in the memory that the requested configuration for the communication terminal is an allowable configuration.

* * * * *